United States Patent Office 2,769,829
Patented Nov. 6, 1956

2,769,829

PROCESS FOR PREPARING OCTAETHYLCYCLO-TETRASILOXANE

Donald G. Dobay, Brecksville, Ohio, assignor to Union Carbide and Carbon Corporation, a corporation of New York No Drawing. Application December 29, 1953,
Serial No. 401,052

8 Claims. (Cl. 260—448.2)

This invention relates to a process for preparing octaethylcyclotetrasiloxane. More particularly, the invention relates to a process for preparing octaethylcyclotetrasiloxane by the controlled hydrolysis of diethyldichlorosilane.

Octaethylcyclotetrasiloxane is known to possess numerous desirable properties which warrant its use in a wide variety of applications. For example, it has been suggested that the compound be employed as a thermostatic fluid or as a heat and power transfer fluid. Heretofore octaethylcyclotetrasiloxane has for the most part, been obtained as a by-product in processes employed for the preparation of relatively high molecular weight diethylsiloxane polymers. Such processes include the hydrolysis of diethyldichlorosilane to a hydrolyzate comprising a mixture of low molecular weight silanols and of various cyclic siloxanes. In such processes, the hydrolyzate is subsequently treated with a catalyst to cause condensation of the silanols and rearrangement of the cyclic siloxanes to relatively high molecular weight diethylsiloxane polymers.

The octaethylcyclotetrasiloxane prepared by the above hydrolysis is not amenable to rearrangement to higher polymeric materials and is normally removed from diethyl siloxane oil or resin end products. Of course the production of octaethylcyclotetrasiloxane as a by-product in such processes is not particularly desirable as it is obtained in relatively small quantities, and thus the need for a new or improved method for the production thereof exists. Therefore, it is an object of this invention to provide a method whereby substantial quantities of octaethylcyclotetrasiloxane may be readily and economically prepared.

The object of this invention is accomplished by conducting the hydrolysis of diethyldichlorosilane in a medium comprising critical proportions of water and a completely water soluble aliphatic monohydric alcohol. The relative amounts of water and alcohol comprising the medium must lie within the range of from three parts by volume of alcohol to one part by volume of water to from about six parts by volume of alcohol to one part by volume of water. It is of extreme importance that the relative amounts of alcohol and water be maintained within the defined limits as otherwise the hydrolysis will not be directed toward the production of substantial quantities of octaethylcyclotetrasiloxane. As the preparation of octaethylcyclotetrasiloxane is primarily a function of the alcohol to water ratio, the amount of water employed is not critical so long as such amount is sufficient to effect complete hydrolysis as shown by the following formula:

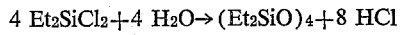

$$4\ Et_2SiCl_2 + 4\ H_2O \rightarrow (Et_2SiO)_4 + 8\ HCl$$

The completely water soluble aliphatic monohydric alcohols which may be employed in the present invention include methanol, ethanol, propanol, isopropanol and the ether alcohols such as ethylene glycol monomethyl ether, ethylene glycol monoethyl ether, ethylene glycol monobutyl ether, diethylene glycol monobutyl ether and the like.

In the practice of my invention, the hydrolysis may be conducted by placing the hydrolysis medium in a flask and by slowly adding diethyldichlorosilane thereto. As the hydrolysis reaction is exothermic, heat is evolved and therefore it will be convenient for practical purposes to initiate the reaction at moderately low temperatures, for example from about 0° C. to about 25° C., and permit the temperature to rise to reflux. During hydrolysis hydrogen chloride is prepared, and a major portion thereof will evolve from the hydrolyzate. The siloxane product is water immiscible and may be readily removed. If desired, the siloxane product may be washed with water to remove traces of hydrogen chloride and alcohol that may be present. Octaethylcyclotetrasiloxane is removed from the product by fractional distillation.

The following examples more fully disclose the instant invention.

Example I

To a three-neck, round bottom, one liter flask equipped with a condenser, thermometer, dropping funnel and stirrer were poured 200 ml. of a water-methanol mixture comprising 150 ml. of methanol and 50 ml. of water. There was then added in dropwise fashion 200 ml. of diethyldichlorosilane. The contents of the flask were continuously stirred during the addition of diethyldichlorosilane and the temperature thereof rose from room temperature to reflux temperature (70° C.). After the addition, stirring was continued for approximately 2 hours while the temperature slowly dropped to approximately 27° C. The siloxane phase was separated, washed free of hydrogen chloride and alcohol and octaethylcyclotetrasiloxane removed by fractional distillation at a reduced pressure. A yield of 101.5 grams of octaethylcyclotetrasiloxane was obtained.

Example II

Employing the apparatus disclosed in Example 1, 200 ml. of a water-methanol mixture comprising 170 ml. of methanol and 30 ml. of water were placed in the flask and there was then added, in dropwise fashion, 200 ml. of diethyldichlorosilane. The contents of the flask were continuously stirred during the addition of diethyldichlorosilane and the temperature rose from room temperature to reflux temperature (78° C.). After the addition of the chlorosilane, stirring was continued for approximately 2¼ hours while the temperature slowly dropped to approximately 27° C. Fractional distillation at reduced pressures of the siloxane phase yielded 120.5 grams of octaethylcyclotetrasiloxane.

Example III

To a three-neck, round bottom, one liter flask equipped with a condenser, thermometer, dropping funnel and stirrer were poured 200 ml. of a water-isopropyl alcohol mixture comprising 150 ml. of isopropyl alcohol and 50 ml. of water. There was then added, in dropwise fashion, 200 ml. of diethyldichlorosilane. The contents of the flask were continuously stirred during the addition of diethyldichlorosilane, and the temperature thereof rose from room temperature to reflux temperature (82° C.). After the addition, stirring was continued for approximately 1½ hours while the temperature slowly dropped to approximately 27° C. Fractional distillation at reduced pressure of the siloxane phase yielded 111.3 grams of octaethylcyclotetrasiloxane.

Example IV

Following the procedure outlined in Example III, 200 ml. of a water-ethylene glycol monoethyl ether mixture, comprising 150 ml. of ethylene glycol monoethyl ether and 50 ml. water, were placed in a three-neck, round bottom, one liter flask equipped with a condenser, thermometer, dropping funnel and stirrer and there was then added, in dropwise fashion, 200 ml. of diethyldichlorosilane. The contents of the flask were continuously stirred during the addition of diethyldichlorosilane and the temperature thereof rose from room temperature to reflux temperature (72° C.). After the addition, stirring was continued for about 2 hours and the temperature slowly dropped to approximately 25° C. Fractional distillation at reduced pressures of the siloxane phase yielded 120 grams of octaethylcyclotetrasiloxane.

*Example V*

To a three-neck, round bottom, one liter flask equipped with a condenser, thermometer, dropping funnel and stirrer were poured 200 ml. of a water-ethanol mixture comprising 150 ml. of ethanol and 50 ml. of water. There was then added, in dropwise fashion, 200 ml. of diethyldichlorosilane. The contents of the flask were continuously stirred during the addition of diethyldichlorosilane and the temperature thereof rose from room temperature to reflux temperature (80° C.). After the addition, stirring was continued for about 2 hours while the temperature slowly dropped to approximately 26° C. Fractional distillation at reduced pressure of the siloxane phase yielded 113.8 grams of octaethylcyclotetrasiloxane.

The critical nature of the alcohol to water ratio of the hydrolysis medium employed to obtain large quantities of octaethylcyclotetrasiloxane is clearly evident by noting the results obtained from the hydrolysis of diethyldichlorosilane with a medium having an alcohol to water ratio outside of the defined limits of the invention. For example, 200 ml. of diethyldichlorosilane was hydrolyzed with 200 ml. of a medium comprising 150 ml. of water and 50 ml. of methanol and there was obtained a yield of 51 grams of octaethylcyclotetrasiloxane. This yield of octaethylcyclotetrasiloxane is approximately 50% of the yield of the compound obtained by the process of the instant invention.

The hydrolysis of diethyldichlorosilane, with a medium comprising the hereinabove defined critical amounts of water and a completely water soluble aliphatic monohydric alcohol to yield substantially only octaethylcyclotetrasiloxane is not applicable to the hydrolysis of other hydrocarbon substituted chlorosilanes. That is, for example, the hydrolysis of dimethyldichlorosilane with such critical amounts of an alcohol-water medium will not yield high quantities of octamethylcyclotetrasiloxane. Moreover, it has been found that the hydrolysis of hydrocarbon substituted monochloro- and trichlorosilanes either alone or in admixture with other chlorosilanes, including diethyldichlorosilane, by the process of this invention will not yield appreciable amounts of cyclic siloxane tetramer.

What is claimed is:

1. An improved process of preparing octaethylcyclotetrasiloxane by the hydrolysis of diethyldichlorosilane which comprises mixing diethyldichlorosilane, substantially free of other hydrolyzable silanes, with water and an aliphatic alcohol as the hydrolysis medium, said aliphatic alcohol being completely water soluble and containing only hydrogen, oxygen and carbon atoms and having only a single hydroxyl group therein, said alcohol being present in said medium in an amount by volume of from about 3 parts of alcohol to about 6 parts of alcohol per part of water.

2. An improved process for preparing octaethylcyclotetrasiloxane by the hydrolysis of diethyldichlorosilane which comprises mixing diethyldichlorosilane, substantially free of other hydrolyzable silanes, with water and methanol as the hydrolysis medium, said methanol being present in said medium in an amount by volume of from about 3 parts of methanol to about 6 parts of methanol per part of water.

3. An improved process for preparing octaethylcyclotetrasiloxane by the hydrolysis of diethyldichlorosilane which comprises mixing diethyldichlorosilane, substantially free of other hydrolyzable silanes, with water and ethanol as the hydrolysis medium, said ethanol being present in said medium in an amount by volume of from about 3 parts of ethanol to about 6 parts of ethanol per part of water.

4. An improved process for preparing octaethylcyclotetrasiloxane by the hydrolysis of diethyldichlorosilane which comprises mixing diethyldichlorosilane, substantially free of other hydrolyzable silanes, with water and isopropyl alcohol as the hydrolysis medium, said isopropyl alcohol being present in said medium in an amount by volume of from about 3 parts of isopropyl alcohol to about 6 parts of isopropyl alcohol per part of water.

5. An improved process for preparing octaethylcyclotetrasiloxane by the hydrolysis of diethyldichlorosilane which comprises mixing diethyldichlorosilane, substantially free of other hydrolyzable silanes, with water and ethylene glycol monoethyl ether as the hydrolysis medium, said ether being present in said medium in an amount by volume of from about 3 parts of ether to about 6 parts of ether per part of water.

6. An improved process for preparing octaethylcyclotetrasiloxane by the hydrolysis of diethyldichlorosilane which comprises mixing diethyldichlorosilane, substantially free of other hydrolyzable silanes, with water and an aliphatic alcohol as the hydrolysis medium, said aliphatic alcohol being completely water soluble and containing only hydrogen, oxygen and carbon atoms and having only a single hydroxyl group therein, said alcohol being present in said medium in an amount by volume of from about 3 parts of alcohol to about 6 parts of alcohol per part of water and recovering octaethylcyclotetrasiloxane.

7. An improved process for preparing octaethylcyclotetrasiloxane by the hydrolysis of diethyldichlorosilane which comprises adding diethyldichlorosilane, substantially free of other hydrolyzable silanes, to water and an aliphatic alcohol as the hydrolysis medium, said aliphatic alcohol being completely water soluble and containing only hydrogen, oxygen and carbon atoms and having only a single hydroxyl group therein, said alcohol being present in said medium in an amount by volume of from about 3 parts of alcohol and about 6 parts of alcohol per part of water.

8. An improved process for preparing octaethylcyclotetrasiloxane by the hydrolysis of diethyldichlorosilane which comprises adding diethyldichlorosilane, substantially free of other hydrolyzable silanes, to water and methanol as the hydrolysis medium, said methanol being present in said medium in an amount by volume of from about 3 parts of methanol to about 6 parts of methanol per part of wtaer.

References Cited in the file of this patent

UNITED STATES PATENTS

| | | |
|---|---|---|
| 2,265,962 | Bent | Dec. 9, 1941 |
| 2,398,672 | Sauer | Apr. 16, 1946 |
| 2,415,389 | Hunter | Feb. 4, 1947 |
| 2,486,162 | Hyde | Oct. 26, 1949 |

FOREIGN PATENTS

| | | |
|---|---|---|
| 635,995 | Great Britain | Apr. 19, 1950 |
| 864,152 | Germany | Jan. 22, 1953 |
| 888,851 | Germany | Sept. 7, 1953 |